United States Patent [19]
Duskin

[11] 3,745,672
[45] July 17, 1973

[54] COLORLESS PAINTING APPARATUS
[76] Inventor: Robert B. Duskin, 17 Barstow Road, Great Neck, N.Y. 11021
[22] Filed: Jan. 21, 1972
[21] Appl. No.: 219,816

Related U.S. Application Data
[63] Continuation-in-part of Ser. No. 64,210, Aug. 17, 1970, abandoned.

[52] U.S. Cl. .................. 35/26, 117/36.2, 35/9 G
[51] Int. Cl. ........................................... G09b 11/04
[58] Field of Search ............... 35/26, 9 G, 36, 66; 283/6; 117/36.2

[56] References Cited
UNITED STATES PATENTS
2,714,074  7/1955  Green ............................ 35/26 UX
3,363,338  1/1968  Skinner ............................... 35/36
3,638,335  2/1972  Gunderson ........................... 35/36

FOREIGN PATENTS OR APPLICATIONS
169,916  10/1921  Great Britain

Primary Examiner—Harland S. Skogquist
Attorney—Abraham Friedman et al.

[57] ABSTRACT

Colorless painting apparatus having chemically treated sheets which are provided with an absorbent color-forming reactant, and a supply of colorless paints each of which chemically reacts with the absorbent color-forming reactant of each treated sheet for imparting different colored illustrations upon the sheet.

6 Claims, 4 Drawing Figures

PATENTED JUL 17 1973 3,745,672
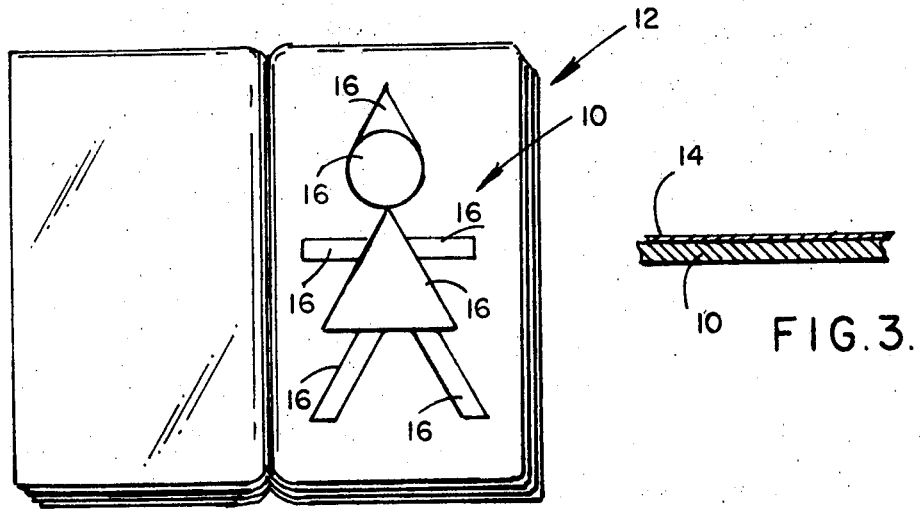
FIG. 1.
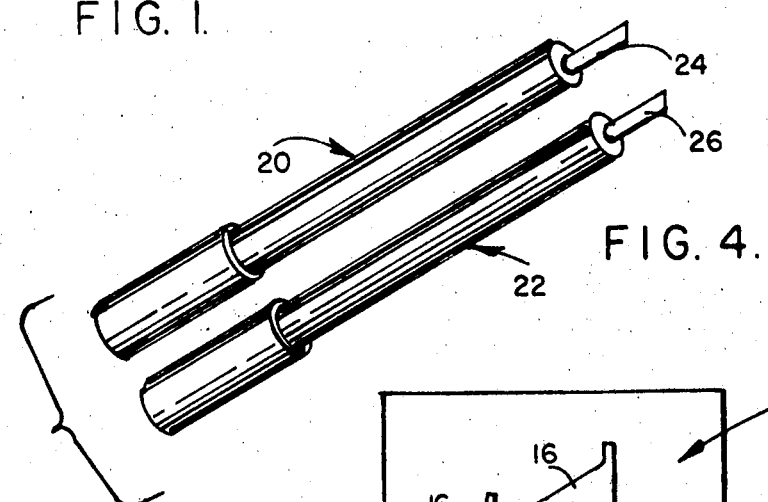
FIG. 3.
FIG. 4.
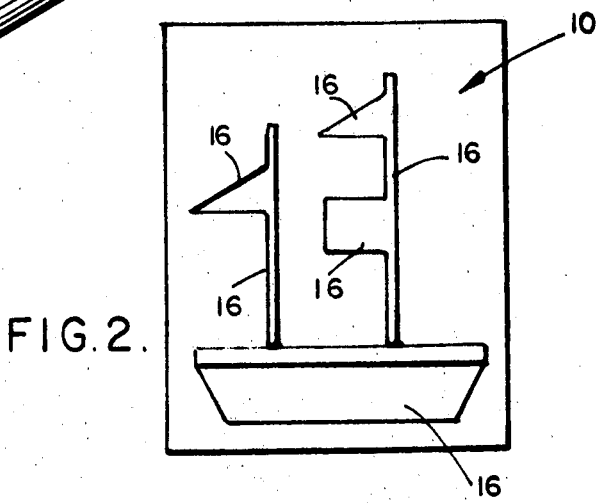
FIG. 2.

COLORLESS PAINTING APPARATUS

CROSS-REFERENCES TO RELATED APPLICATIONS

This is a continuation-in-part of co-pending U.S. Pat. application Ser. No. 64,210, filed on Aug. 17, 1970 and now abandoned.

BACKGROUND OF THE INVENTION

The present invention relates generally to educational devices for children and the like, and more particularly to a painting assembly.

In this respect, the present invention provides for a colorless painting apparatus, educational in nature, that may be utilized by children for permitting them to learn different colors and different geometrical configurations. Moreover, the present invention permits children to form different color schemes along selected geometric configurations on a single sheet of paper, or the like, in any manner by which the child so desires, without getting either the clothing of the child, the person of the child, or any of the surrounding medium, marked or discolored in a generally permanent fashion, or what may be otherwise characterized as difficult to cleanse stains or discolorations.

As is well known in the art, children, when working with paints or other marking devices, which are conventional in the art, often create not only a sloppy environment, but also tend to ruin their clothing because of the inherent lack of care exercised therewith. Thus, the use of conventional paints, inks, crayons or other marking substances by children is, to a certain extent, undesirable.

SUMMARY OF THE INVENTION

Accordingly, it is an object of the present invention to provide a colorless painting assembly for children which may be utilized without any consideration with regard to the extent of care exercised by the children, for imparting color configurations or illustrations upon a sheet of paper.

It is another object of the present invention to permit children to form various colors on a sheet of paper in a delayed dramatic manner for enhancing the interest of the children in utilizing the assembly pursuant to the present invention.

To this end, the present invention relates generally to colorless painting apparatus comprising at least one chemically treated sheet having an absorbent color-forming reactant, a supply of colorless paints each of which chemically reacts with said absorbent color-forming reactant of said treated sheet, one colorless paint being provided with a chemical composition differing from a chemical composition of another colorless paint to produce different visible colors respectively on said treated sheet when said colorless paints are applied thereto, said colorless paints each including an evaporative chemical agent which retards color appearance on said treated sheet until said chemical agent evaporates from the surface of said treated sheet, thereby, simulating magically a delayed formation of colors.

BRIEF DESCRIPTION OF THE DRAWINGS

With the above and additional objects and advantages in view as will hereinafter appear, this invention comprises the devices, combinations and arrangements of parts hereinafter described and illustrated in the accompanying drawings of a preferred embodiment in which:

FIG. 1 illustrates a perspective view of an open book having pages or sheets bound therein and upon which sheets are provided various illustrative configurations;

FIG. 2 illustrates a plan view of an isolated page upon which is provided a different illustration to be painted upon;

FIG. 3 illustrates a cross-sectional view of a typical chemically treated page, pursuant to the principals of the present invention; and FIG. 4 illustrates a pair of colorless paint applicators for imparting various colors to the chemically treated pages illustrated in FIGS. 1 and 2.

DETAILED DESCRIPTION OF THE INVENTION

In the preferred form of the invention, a sheet of generally ordinary paper is specially chemically treated and provided with a chemical coating. The coating is an absorbent reactant including an acid clay-like material such as attapulgite, or zeolite material such as sodium aluminum silicate material, or such, in which the sodium has been exchanged for hydrogen or some other metal ion. When a colorless material, which will be described hereinbelow, is brought into contact with the coated paper, a chemical reaction occurs which makes a visible color on an area of the coated paper upon which the colorless material has been applied.

The colorless material is well known, being an absorbate substance which may be or include one or more of the reactants of the phthalide type, such as crystal violet lactone, which is 3,3-bis-(p-dimethylaminophenyl)-6-dimethylamino phthalide, and malachite green lactone, which is 3,3-bis-(p-dimethylaminophenyl) phthalide. The crystal violet lactone produces a dark blue color, whereas the malachite green lactone produces a bluish green color, immediately when coming into absorption contact with the coated paper which is coated or sensitized as stated above. Other organic color-reactant compounds than that of the crystal violet lactone and the malachite green lactone, aforementioned, which produce different colors are well known in the art and, therefore, need not be set forth herein.

The phthalide compound, like all dyes, tends to fade in time and, therefore, a secondary color-reactant of the oxidizing type may be added thereto to form a color which is longer lasting. The secondary color-reactant oxidizes from a normally colorless form to a colored form when coming into contact with the clay materials described above, after the passage of some hours or days. The secondary color-reactant may be of the benzoyl leuco methylene blue type.

The color-reactants, such as named above, are dissolved in a suitable liquid to form a colorless solution, characterized hereinafter as colorless paint, which may be easily applied to the coated paper. The colorless paint may be applied by a conventional paint brush or, due to its colorless characteristic which does not produce any discoloration on articles other than the coated paper, may even be applied by the user's fingers. The colorless paints in the above case may be contained in respective receptacles. Each receptacle may be marked to indicate the associated color produced when the colorless paint is applied to the coated paper, there being several different associated colors. The user would then paint in a conventional manner wherein the selected color would become visible immediately upon contact with the coated paper.

Pursuant to the preferred embodiment or best mode of the present invention, however, the colorless paint may also be applied by a conventional capillary action hand marking device or applicator provided with a felt writing nib which continually absorbs the colorless paint from a saturated felt sponge encased in a small container. The container may be the refillable type. Each container would be marked to indicate the associated color, as set forth above.

Crayons may also be provided to include the colorless paint. The colorless paint would be disposed or embedded within the crayon. Each crayon would produce a single color wherein there would be several crayons to provide different colors.

Referring now to the drawings and more particularly to FIGS. 1 and 2 thereof, the present invention, pursuant to the best mode thereof, includes one or a plurality of chemically treated sheets in a manner as aforementioned, the sheets being denoted generally by the reference character 10. The sheets 10 may be either isolated from one another for independent mounting on a suitable support, or alternatively, be bound in book-form and denoted generally by the reference character 12 in FIG. 1.

As indicated above, the sheets are chemically treated so as to be provided with a chemical coating denoted by the reference character 14 in FIG. 3 and provided with respective illustrations of various geometrical configurations or isolated zones 16 in, and along which, suitable colorless paints in the nature as described above are applicable such as by means of different colorless paint applicators 20 and 22 respectively which are illustrated in FIG. 4.

In this respect, the applicators 20 and 22 respectively are constituted as conventional capillary action hand marking devices which are provided with felt writing nibs 24 and 26 respectively, which in a conventional writing manner may be brought into contact with the various illustrative zones 16 for imparting to the latter different colors respectively. Of course, the applicators 20 and 22 respectively are provided with suitable labels or the like for indicating the nature or respective color which the colorless fluid or paint contained therein will impart to the sheets or pages 10 upon contacting the latter.

Accordingly, the illustrative subject-matter of zones 16 provided on the treated sheets or pages 10 is operatively associated with the various colorless paint applicators, such as the applicators 20 and 22 respectively, for specifically defining areas of selected configuration in which and along which the colorless paints may be applied for imparting to the specially chemically treated pages 10 one or a plurality of differently colored zone configurations in any manner selected by the user and particularly a child.

Moreover, because of the nature of the colorless paints, should the child inadvertently smear either his person, his clothing or his general environmental surroundings with the applicators 20 and 22 respectively, absolutely no discolorations will form on the smeared surfaces and, thus, no stains or the like will form thereon, the surfaces remaining moistened only temporarily until the colorless paint fluids evaporate. The result therefore is that the child will learn to utilize marking devices in general within well defined boundaries or zones, the child also learning the nature of the geometrical configurations respectively of the zones and the various colors imparted thereto without ever staining or otherwise dirtying his surrounding environment or person.

Pursuant to another feature of the present invention, the colorless paints, of the nature described above, may also include a further colorless fluid or chemical which acts to retard the color appearance or formation on the chemically treated sheets 10 for a brief period to thereby stimulate the child's interest in utilizing the colorless paints in a manner which simulates, magically, a delayed formation of colors.

In this respect, the additional chemical or color retardant may be that which is commonly known as dioxane and is preferably constituted as approximately 20 percent, by volume, of the overall colorless fluid. This additional chemical dioxane retards or inhibits the appearance of color when applied to the chemically treated pages 10 for a brief period or that period during which the dioxane undergoes evaporation. As the dioxane evaporates, the remaining colorless paint substance applied to the chemically treated pages will act to cause a gradual appearance of color. Clearly, the gradual appearance or formation of the colors dramatically simulates magically, insofar as the child is concerned, color-formation by the child himself, this constituting a significant approach toward stimulating the child's interest in the educational values of the apparatus.

It is also of significance, that although the colorless painting apparatus, pursuant to the present invention can be employed by children to provide an extremely pleasing and creative past-time, adults, likewise will find the apparatus quite interesting and useful.

Numerous alterations of the structure herein disclosed will suggest themselves to those skilled in the art. However, it is to be understood that the present disclosure relates to a preferred embodiment of the invention which is for purposes of illustration only and is not be construed as a limitation of the invention.

What is claimed is:

1. Colorless painting apparatus comprising at least one chemically treated sheet having an absorbent color-forming reactant, a supply of colorless paints each of which chemically reacts with said absorbent color-forming reactant of said treated sheet, one colorless paint being provided with a chemical composition differing from a chemical composition of another colorless paint to produce different visible colors respectively on said treated sheet when said colorless paints are applied thereto, said colorless paints each including an evaporative chemical agent which retards color appearance on said treated sheet until said chemical agent evaporates from the surface of said treated sheet, thereby, simulating magically a delayed formation of colors.

2. Colorless painting apparatus comprising at least one chemically treated sheet having an absorbent color-forming reactant, a supply of colorless paints each of which chemically reacts with said absorbent color-forming reactant of said treated sheet, one colorless paint being provided with a chemical composition differing from a chemical composition of another colorless paint to produce different visible colors respectively on said treated sheet when said colorless paints are applied thereto, said treated sheet including means thereon operatively associated with said colorless paints for defining isolated visible zones of preselected configuration in which one or a plurality of said colorless paints is applicable; said treated sheet, thereby, adapted for being selectively imparted with one or a plurality of differently colored zone configurations, said colorless paints including an evaporative chemical agent which retards color appearance on said treated sheet until said chemical agent evaporates from the surface of said treated sheet, thereby, simulating magically a delayed formation of colors.

3. Colorless painting apparatus as claimed in claim 2 including a plurality of chemically treated sheets each of which includes different illustrations which constitute said isolated visible zones of preselected configuration.

4. Colorless painting apparatus as claimed in claim 3 wherein said sheets are bound as a book.

5. Colorless painting apparatus as claimed in claim 2 wherein said colorless paints have respective applicators.

6. Colorless painting apparatus as claimed in claim 5 wherein each applicator includes a capillary-action felt writing-nib.

* * * * *